(12) United States Patent
Morishima (10) Patent No.: US 7,438,535 B2
(45) Date of Patent: Oct. 21, 2008

(54) STRUCTURE OF EJECTOR PUMP

(75) Inventor: Shingo Morishima, Toyota (JP)

(73) Assignee: Denso Corporation, Kariya (JP)

( * ) Notice: Subject to any disclaimer, the term of this patent is extended or adjusted under 35 U.S.C. 154(b) by 898 days.

(21) Appl. No.: 10/755,381

(22) Filed: Jan. 13, 2004

(65) Prior Publication Data

US 2005/0002797 A1 Jan. 6, 2005

(30) Foreign Application Priority Data

Jan. 15, 2003 (JP) ............... 2003-006905

(51) Int. Cl.
*F04F 5/48* (2006.01)
*H01M 2/02* (2006.01)
(52) U.S. Cl. ...................... 417/187; 429/34
(58) Field of Classification Search ........... 417/182, 417/187, 190, 191; 429/34, 38, 39
See application file for complete search history.

(56) References Cited

U.S. PATENT DOCUMENTS

| | | | | |
|---|---|---|---|---|
| 2,107,084 A | * | 2/1938 | Pletcher | 451/102 |
| 3,472,172 A | * | 10/1969 | Vignerot | 417/182.5 |
| 4,228,958 A | * | 10/1980 | Perry | 239/411 |
| 4,735,554 A | * | 4/1988 | Phillips, II | 417/189 |
| 5,441,821 A | * | 8/1995 | Merritt et al. | 429/17 |
| 6,858,340 B2 | | 2/2005 | Sugawara et al. | |
| 2002/0022172 A1 | * | 2/2002 | Sahoda et al. | 429/34 |

FOREIGN PATENT DOCUMENTS

| JP | A-01-105000 | 4/1989 |
|---|---|---|
| JP | A-05-089900 | 4/1993 |
| JP | A-05-272498 | 10/1993 |
| JP | 02000274835 | * 10/2000 |
| JP | A 2001-266922 | 9/2001 |
| JP | A-2002-227799 | 8/2002 |

* cited by examiner

*Primary Examiner*—Charles G Freay
(74) *Attorney, Agent, or Firm*—Oliff & Berridge, PLC (57) ABSTRACT

An ejector pump is provided which works to use dynamic energy of a jet of a main fluid emitted from a nozzle to suck a sub-fluid therein. When it is required to stop the ejector pump, the needle is moved to bring a sealing surface formed on a head thereof into abutment with a sealing surface formed around a main fluid flow path extending inside the ejector pump to close the main fluid flow path, thereby inhibiting the fluid pressure from acting on any downstream device. Upon the abutment, the needle is kept away from a nozzle, thereby avoiding undesirable wear or deformation of the needle and nozzle.

10 Claims, 7 Drawing Sheets

STRUCTURE OF EJECTOR PUMP

BACKGROUND OF THE INVENTION

1. Technical Field of the Invention

The present invention relates generally to an ejector pump in which a jet of a main fluid emitted from a nozzle serves to suck a sub-fluid, and more particularly to an improved structure of such an ejector pump which is suitable for use in a fuel cell system.

2. Background Art

In order to improve a utility factor of fuel and power generation efficiency of fuel cells, off-gas circulation systems are known which work to suck the off-gas discharged from hydrogen electrodes of the fuel cells using a pump and mix it with fuel to be supplied to the fuel cells. The pump used to circulate the off-gas is usually implemented by an ejector pump because it can be actuated using kinetic energy of the fuel and is of great advantage to power saving. For instance, Japanese Patent First Publication No. 2001-266922 teaches the above type of system.

Fuel cell systems equipped with the ejector pump, however, encounter the problem in that when the fuel cells suspend power generation suddenly, that is, when the fuel cells suspend consumption of a hydrogen gas suddenly, the ejector pump stops transforming a static pressure of the hydrogen gas stored within a fuel tank into a dynamic one, thereby causing the static pressure of the hydrogen gas outputted from the fuel tank to act on the fuel cells as it is through the ejector pump, which, in the worst case, results in breakage of electrode films of the fuel cells, thus leading to a failure in operation of the fuel cells. Moreover, repeated application of the pressure of the hydrogen gas to the electrode films will precipitate the fatigue of the electrode films undesirably. If the supply of the hydrogen gas is cut within the fuel tank, a residual pressure in a line between the fuel tank and the ejector pump is exerted on the fuel cells through the ejector pump, which gives rise to the same problem as described above.

The above type of fuel cell systems also have an additional problem in that when the amount of hydrogen gas supplied to the fuel cells is insufficient, the dynamic energy required to circulate the off-gas will be insufficient, thus resulting in lack in a circulated amount of the off-gas.

SUMMARY OF THE INVENTION

It is therefore a principal object of the invention to avoid the disadvantages of the prior art.

It is another object of the invention to provide an ejector pump designed to inhibit the pressure of a main fluid from acting on any device disposed downstream of the ejector pump undesirably.

If is a further object of the invention to provide an ejector pump designed to ensure suction of off-gas even when the amount of a main fluid is insufficient.

According to one aspect of the invention, there is provided an ejector pump which may be employed in fuel cell systems for electric vehicles. The ejector pump comprises: (a) a flow path unit having formed therein a fluid discharge path leading to a fluid outlet; (b) a nozzle body including a main fluid inlet port to which a main fluid is inputted, a nozzle which has a nozzle outlet from which a jet of the main fluid is emitted to the discharge path of the flow path unit and then discharged from the fluid outlet, and a main fluid flow path which has a length and communicates between the main fluid inlet port and the nozzle outlet of the nozzle, physical energy of the jet of the main fluid emitted from the nozzle serving to suck and direct a sub-fluid to the discharge path of the flow path unit, the nozzle body having a first sealing surface exposed to a portion of the main fluid flow path; and (c) a needle disposed coaxially within the main fluid flow path. The needle is slidable in a lengthwise direction of the main fluid flow path to change an open area of the nozzle outlet. The needle has a second sealing surface. When the needle is moved within the main fluid flow path to bring the second sealing surface thereof into abutment to the first sealing surface of the nozzle body, it closes the main fluid flow path.

Specifically, when it is required to stop the ejector pump, the needle is moved until the second sealing surface abuts the first sealing surface to close the main fluid flow path, thereby inhibiting the pressure of the main fluid from acting on any device located downstream of the ejector pump undesirably.

In the preferred mode of the invention, the needle is kept away from the nozzle upon the abutment of the second sealing surface to the first sealing surface. Specifically, the ejector pump is so designed that closing of the main fluid flow path is not achieved by direct abutment of the needle with the nozzle, thereby avoiding wear or deformation of the needle and the nozzle to ensure the stability of regulation of a flow rate of the main fluid for an extended period of time.

The nozzle body has an inner wall forming the main fluid flow path. The inner wall has a shoulder defining the first sealing surface. The needle has a shoulder defining the second sealing surface.

The ejector pump may further comprise a heater working to add thermal energy to the main fluid. The addition of the thermal energy to the main fluid results in an increase in dynamic energy of the main fluid, thus ensuring required suction of the main fluid into the ejector pump even when the flow rate of the main fluid is lower. The heater may be disposed in a portion of the nozzle body which surrounds a location where the first sealing surface abuts the second sealing surface. This avoids locking of the needle due to freezing of the first and second sealing surfaces which would arise when the ejector pump is used in low-temperature environments.

According to the second aspect of the invention, there is provided an ejector pump which comprises: (a) a flow path unit having formed therein a fluid discharge path leading to a fluid outlet; (b) a nozzle body including a main fluid inlet port to which a main fluid is inputted, a nozzle which has a nozzle outlet from which a jet of the main fluid is emitted to the discharge path of the flow path unit and then discharged from the fluid outlet, and a main fluid flow path which has a length and communicates between the main fluid inlet port and the nozzle outlet of the nozzle, physical energy of the jet of the main fluid emitted from the nozzle serving to suck and direct a sub-fluid to the discharge path of the flow path unit; and (c) a heater working to add thermal energy to the main fluid. The addition of the thermal energy to the main fluid results in an increase in dynamic energy of the main fluid, thus ensuring required suction of the main fluid into the ejector pump even when the flow rate of the main fluid is lower.

In the preferred mode of the invention, the heater is disposed in a portion of a circumference of the nozzle body in which the main fluid inlet port is formed. This enhances transfer of heat to the main fluid.

The heater may be implemented by a PTC heater. The PTC heater, as is well known in the art, works as a constant temperature heater designed to perform a temperature self-control function. Use of the PTC heater, thus, eliminates the need for an on-off control circuit required to regulate the temperature of heat added to the main fluid and results in a simplified structure of the ejector pump as compared with when a hot wire heater is employed.

The PTC heater is installed inside the nozzle body. The nozzle body and the pipe unit may be made of separate members, respectively, and joined together to complete the ejector pump. This structure serves to divide a heat mass of the ejector pump into three. The installation of the PTC heater within the nozzle body facilitates easy of the transfer of heat to the inside of the nozzle body. Specifically, the structure of the ejector pump permits direct transfer of the heat from the PTC heater to the nozzle body, but has heat transfer blocking interfaces formed between the nozzle body and the pipe unit, thereby minimizing the transfer of the heat to the pipe unit from the PTC heater, which enhances the efficiency of consuming the thermal energy produced by the PTC heater in the nozzle body.

The ejector pump further comprises a needle movable in a lengthwise direction of the main fluid flow path to change an open area of the nozzle outlet and a drive unit working to move the needle. The drive unit, the nozzle body, and the pipe unit may be made of separate members, respectively.

According to the third aspect of the invention, there is provided a fuel cell system which comprises: (a) a fuel cell working to produce an electrical energy arising from chemical reaction of hydrogen with oxygen; (b) a hydrogen supply line through which a hydrogen gas is supplied from a hydrogen supply device to the fuel cell; (c) an off-gas circulation line working to circulate an off-gas, which is emitted from the fuel cell and contains an unreacted portion of the hydrogen gas not subjected to the chemical reaction, to the fuel cell through the hydrogen supply line; and (d) an ejector pump installed in a junction of the hydrogen supply line and the off-gas circulation line. The ejector pump includes (a) a flow path unit having formed therein a fluid discharge path leading to a fluid outlet, (b) a nozzle body including a main fluid inlet port to which the hydrogen gas supplied from the hydrogen supply device is inputted, a nozzle which has a nozzle outlet from which a jet of the hydrogen gas is emitted to the discharge path of the flow path unit and then discharged from the fluid outlet to the fuel cell through the hydrogen supply line, and a main fluid flow path which has a length and communicates between the main fluid inlet port and the nozzle outlet of the nozzle, physical energy of the jet of the hydrogen gas emitted from the nozzle serving to suck and mix the off-gas with the hydrogen gas emerging from the nozzle, the nozzle body having a first sealing surface exposed to a portion of the main fluid flow path, and (c) a needle disposed coaxially within the main fluid flow path. The needle is slidable in a lengthwise direction of the main fluid flow path to change an open area of the nozzle outlet. The needle has a second sealing surface. When the needle is moved within the main fluid flow path and brings the second sealing surface thereof into abutment to the first sealing surface of the nozzle body, the main fluid flow path is closed. Specifically, when it is required to stop the ejector pump, the needle is moved until the second sealing surface abuts the first sealing surface to close the main fluid flow path, thereby inhibiting the pressure of the main fluid from acting on any device located downstream of the ejector pump undesirably.

According to the fourth aspect of the invention, there is provided a fuel cell system which comprises: (a) a fuel cell working to produce an electrical energy arising from chemical reaction of hydrogen with oxygen; (b) a hydrogen supply line through which a hydrogen gas is supplied from a hydrogen supply device to the fuel cell; (c) an off-gas circulation line working to circulate an off-gas, which is emitted from the fuel cell and contains an unreacted portion of the hydrogen gas not subjected to the chemical reaction, to the fuel cell through the hydrogen supply line; and (c) an ejector pump installed in a junction of the hydrogen supply line and the off-gas circulation line. The ejector pump includes (a) a flow path unit having formed therein a fluid discharge path leading to a fluid outlet, (b) a nozzle body including a main fluid inlet port to which the hydrogen gas is inputted, a nozzle which has a nozzle outlet from which a jet of the hydrogen gas is emitted to the discharge path of the flow path unit and then discharged from the fluid outlet to the fuel cell through the hydrogen supply line, and a main fluid flow path which communicates between the main fluid inlet port and the nozzle outlet of the nozzle, physical energy of the jet of the hydrogen gas emitted from the nozzle working to suck and mix the off-gas with the hydrogen gas emerging from the nozzle, and (c) a heater working to add thermal energy to the hydrogen gas. Specifically, the addition of the thermal energy to the main fluid results in an increase in dynamic energy of the main fluid, thus ensuring required suction of the main fluid into the ejector pump even when the flow rate of the main fluid is lower.

BRIEF DESCRIPTION OF THE DRAWINGS

The present invention will be understood more fully from the detailed description given hereinbelow and from the accompanying drawings of the preferred embodiments of the invention, which, however, should not be taken to limit the invention to the specific embodiments but are for the purpose of explanation and understanding only.

In the drawings.

DESCRIPTION OF THE PREFERRED EMBODIMENTS

Figure 1:
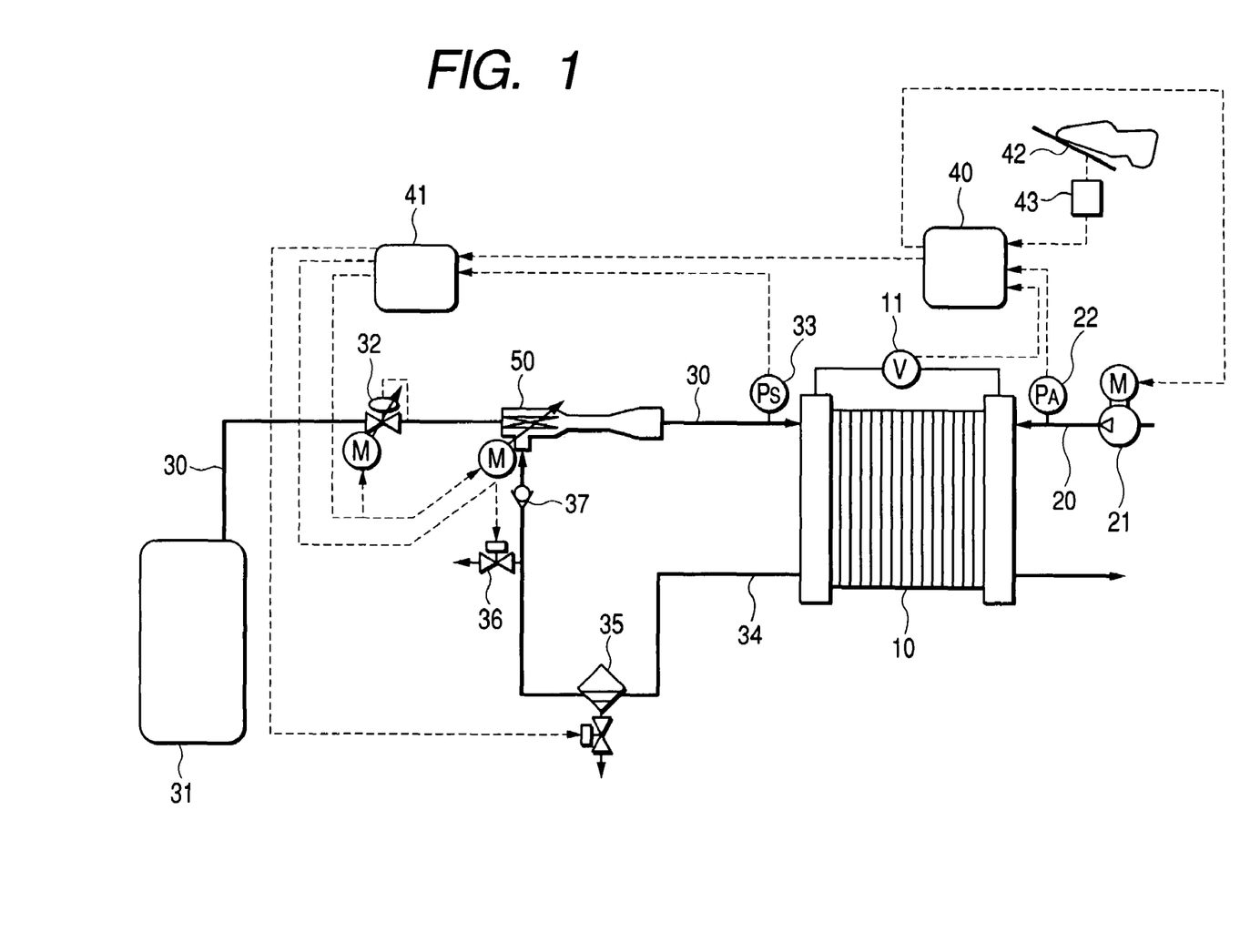
FIG. 1 is a block diagram which shows a structure of a fuel cell system according to the first embodiment of the invention.

Referring to the drawings, wherein like reference numbers refer to like parts in several views, particularly to FIG. 1, there is shown a fuel cell system according to the first embodiment of the invention. The fuel cell system is illustrated, as an example, as being used as a power source to propel an electric vehicle (i.e., a fuel cell-powered vehicle).

The fuel cell system consists essentially of a fuel cell stack 10, an air supply device 21, a fuel supply device 31, an ejector pump 50, and controllers 40 and 41.

The fuel cell stack 10, as is well known in the art, works to convert energy produced by electrochemical reaction of oxygen and hydrogen (i.e., fuel) into electric power. The fuel cell stack 10 is made up of a plurality of solid polyelectrolyte fuel cells. Each cell is made of a pair of electrodes (will also be called an oxygen and a hydrogen electrode below) and an electrolyte film disposed between the electrodes. The fuel cell stack 10 is used to supply the power to electric loads such as a drive motor and a storage battery (not shown) installed in the electric vehicle. The fuel cell stack 10 is supplied with hydrogen and air (oxygen) and induces electrochemical reactions thereof at the electrodes which are of the forms:

Hydrogen electrode

Oxygen electrode

The above electrochemical reactions produce water. Additionally, humidified hydrogen and air gasses are supplied into the fuel cell stack 10 which will cause condensate water to be produced in the fuel cell stack 10. The water stays within the fuel cell stack 10. The fuel stack 10 has installed thereon a voltage sensor 11 which works to measure the voltage developed across ends of the fuel cell stack 10 and output a signal indicative thereof to the controller 40.

The fuel cell system also includes an air supply line 20 and a hydrogen supply line 30. The air supply line 20 works to supply air (oxygen) to the oxygen electrodes (i.e., positive electrodes) of the fuel cell stack 10. The hydrogen supply line 30 works to supply hydrogen to the hydrogen electrodes (i.e., negative electrodes) of the fuel cell stack 10. The air supply device 21 is installed in the most upstream portion of the air supply line 20. The fuel supply device 31 is installed in the most upstream portion of the hydrogen supply line 30. The air supply device 21 is implemented by, for example, a compressor. The fuel supply device 31 is implemented by, for example, a high-pressure hydrogen tank filled with hydrogen gas.

The hydrogen supply line 30 has disposed therein a regulator 32 working to regulate the amount and pressure of hydrogen outputted from the fuel supply device 31. The air supply line 20 has an air supply pressure sensor 22 installed in a portion thereof near an air inlet of the fuel cell stack 10. The air supply pressure sensor 22 works to measure a supplied pressure of the air and output a signal indicative thereof to the controller 40. Similarly, the hydrogen supply line 30 has a hydrogen supply pressure sensor 33 installed in a portion thereof near a hydrogen inlet of the fuel cell stack 10. The hydrogen supply pressure sensor 33 works to measure a supplied pressure of the hydrogen and output a signal indicative thereof to the controller 41. The pressure of hydrogen supplied to the fuel cell stack 10 is equivalent to a discharge pressure (i.e., an outlet pressure) of the ejector pump 50.

The fuel cell system also includes an off-gas circulation line 34 which works to mix a unreacted hydrogen containing off-gas discharged from the fuel cell stack 10 with a main flow of hydrogen gas supplied from the fuel supply device 31 and re-supply it to the fuel cell stack 10. The off-gas circulation line 34 connects between a hydrogen outlet of the fuel cell stack 10 and a downstream port of the regulator 32 installed in the hydrogen supply line 30. The off-gas circulation line 34 has disposed therein an gas liquid separator 35, an on-off drain valve 36, and a check valve 37. The gas liquid separator 35 works to separate the water from the off-gas and discharge it outside the fuel cell system through an on-off drain valve actuated by the controller 41. The drain valve 36 works to discharge the off-gas outside the fuel cell system. The check valve 37 works to check a back flow of the off-gas when being discharged outside the fuel cell system.

The ejector pump 50 is installed in a junction of the hydrogen supply line 30 and the off-gas circulation line 34 and works to circulate the off-gas to the fuel cell stack 10. The ejector pump 50 is implemented by a kinetic vacuum pump which works to suck the off-gas with aid of dynamic energy of the main flow of hydrogen gas supplied from the fuel supply device 31 and circulate it to the fuel cell stack 10. The ejector pump 50 will also be described later in detail.

The fuel cell system includes, as described above, the two controllers (i.e., electronic control units) 40 and 41. The first controller 40 receives an output of an accelerator position sensor 43 indicating a position of an accelerator pedal 42 of the electric vehicle and determine the amount of electric power to be generated by the fuel cell stack 10 which is required as a function of the position of the accelerator pedal 42. The first controller 40 also determines a supplied amount of the hydrogen, a circulated amount of the off-gas, and a supplied pressure of the hydrogen gas (i.e., a discharge pressure of the ejector pump 50) which are required to provide the required amount of the electric power and provides a command signal to the second controller 41.

The first controller 40 also determines the amount of air required to provide the required amount of electric power to be generated by the fuel cell stack 10 and controls the speed of the compressor 21. Specifically, the first controller 40 feedback-controls the speed of the compressor 21 using an output of the air supply pressure sensor 22. The first controller 40 also controls the power generation of the fuel cell stack 10 using an output of the voltage sensor 11.

The second controller 41 receives a control signal outputted from the first controller 40 and an output of the hydrogen supply pressure sensor 33. The second controller 41 also determines a target valve position of the regulator 32 as a function of the required amount of hydrogen to be supplied to the fuel cell stack 10 and a target nozzle position of the ejector pump 50 as a function of the required amount of the off-gas to be circulated to the fuel cell stack 10 and outputs control signals to the regulator 32 and the ejector pump 50. Further, the second controller 41 outputs control signals to the gas liquid separator 35 and the drain valve 36.

Figure 2:
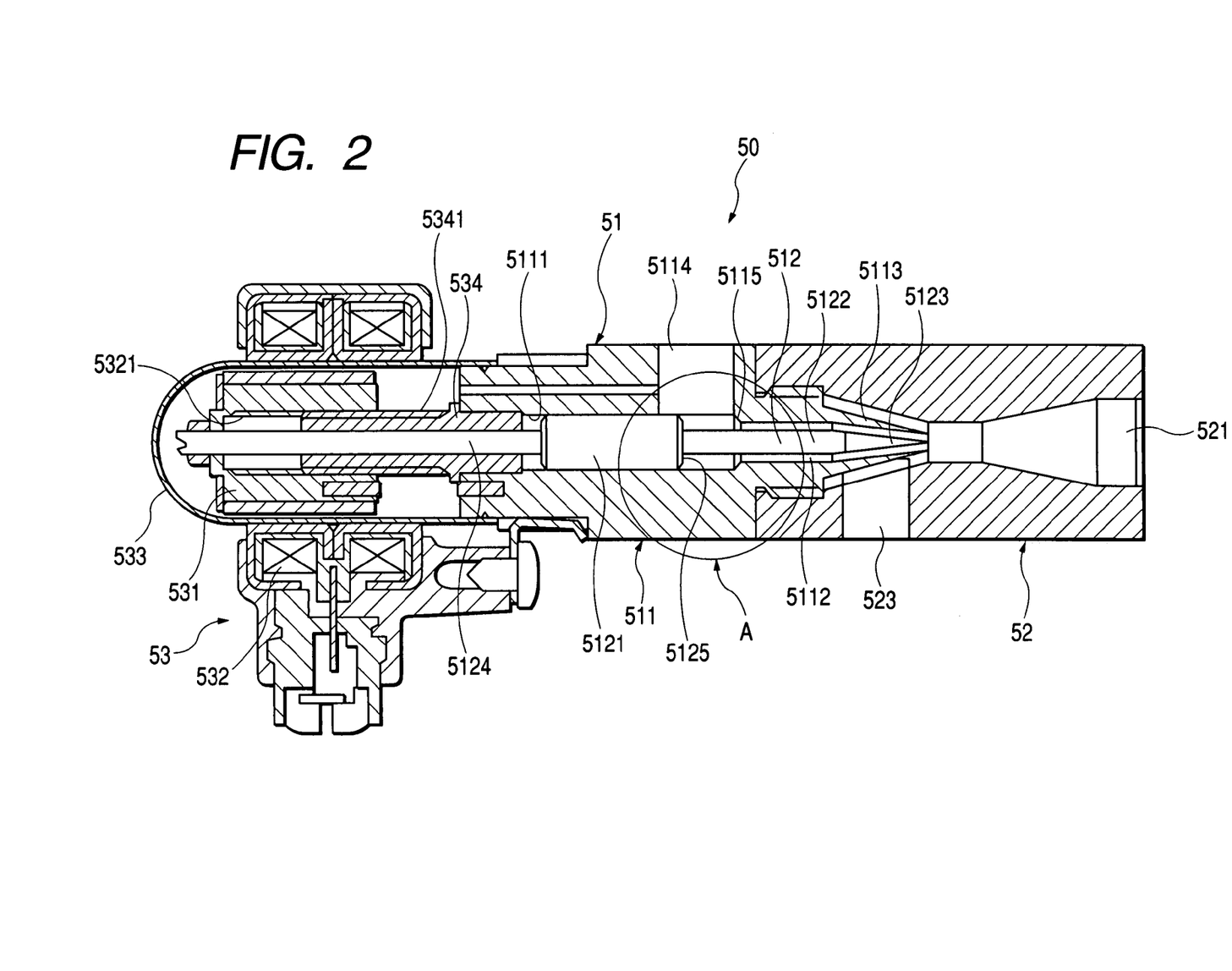
FIG. 2 is a longitudinal sectional view which shows an internal structure of an ejector pump employed in the fuel cell system, as illustrated in FIG. 1, which is placed in a fully open position.
Figure 3:
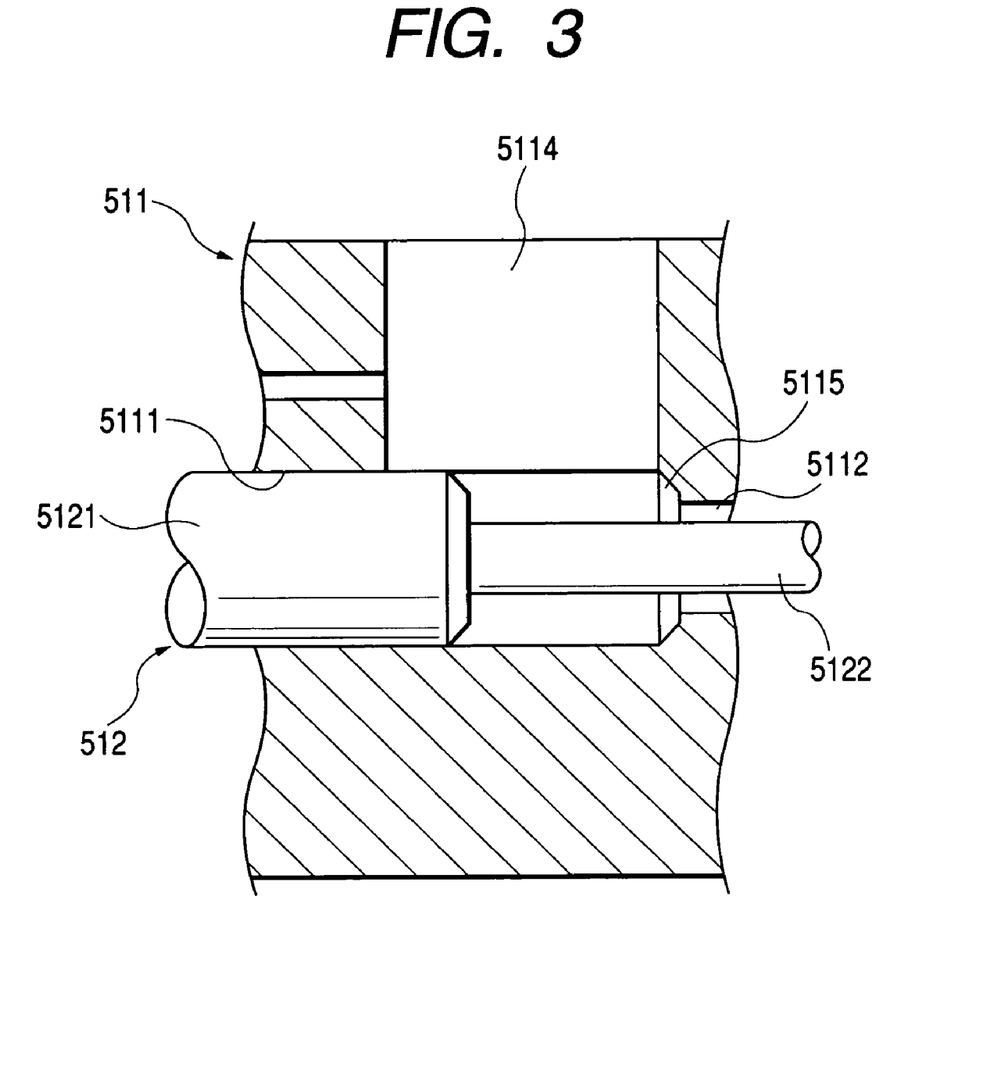
FIG. 3 is an enlarged sectional view of an encircled portion, as indicated by A in FIG. 2.
Figure 4:
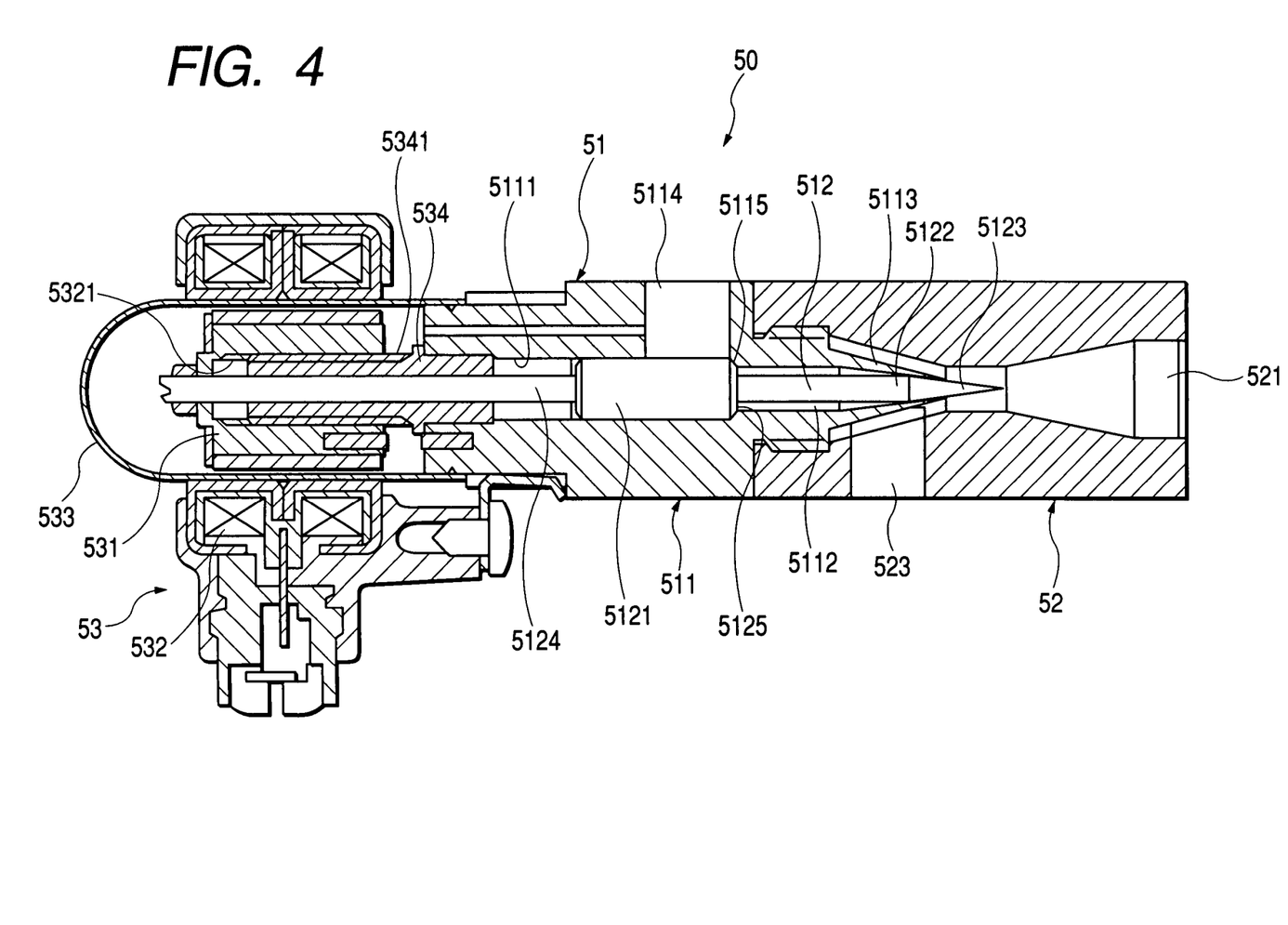
FIG. 4 is a longitudinal sectional view which shows an internal structure of an ejector pump employed in the fuel cell system, as illustrated in FIG. 1, which is placed in a closed position.

The structure of the ejector pump 50 will be described below in detail with reference to FIGS. 2 to 4. FIG. 2 shows an internal structure of the ejector pump 50 placed in a fully open position. FIG. 3 is an enlarged view of an encircled portion, as indicated by A in FIG. 2. FIG. 4 shows an internal structure of the ejector pump 50 placed in a closed position.

The ejector pump 50 is made up of a nozzle unit 51, a pipe unit 52, and a drive unit 53. The units 51, 52, and 53 are joined in a suitable fastening manner to complete the ejector pump 50.

The nozzle unit 51 includes a nozzle body 511 and a needle 512. The nozzle body 511 and the needle 512 are made of a corrosion resisting metal such as SUS316L or SUS304L. The needle 512 is subjected to a DLC (diamond-like carbon) treatment in order to improve slidability and abrasion resistance thereof.

The nozzle body 511 is made of a hollow cylinder and has a cylindrical guide hole 5111, a cylindrical main fluid flow path 5112, and a tapered nozzle 5113. The guide hole 5111 serves to guide sliding movement of the needle 512. The main fluid flow path 5112 is smaller in diameter than the guide hole 5111 and connects between a main fluid flow port, as will be described later in detail, and the nozzle 5113. The guide hole 5111, the main fluid flow path 5112, and the nozzle 5113 are aligned in a lengthwise direction of the nozzle body 511.

The nozzle body 511 has formed in a central portion thereof the main fluid flow inlet port 5114 leading to the main fluid flow path 5112. The main fluid flow inlet port 5114 connects with the hydrogen supply line 30 and is supplied with the hydrogen gas from the hydrogen supply device 31.

The nozzle body 511 has a chambered surface working as a sealing surface 5115, as will also be referred to as a nozzle body side sealing surface below, which faces and surrounds an end of the main fluid flow path 5112 leading to the main flow inlet port 5114.

The needle 512 is made of a cylindrical member and consists of a first small-diameter portion 5122, a second small-diameter portion 5124 and a large-diameter-portion 5121 formed between the first and second small-diameter portions 5122 and 5124. The large-diameter portion 5121 is so disposed within the guide hole 5111 to be slidable in the lengthwise direction of the needle 512. The first small-diameter portion 5122 extends in alignment with the large-diameter portion 5121 and the second small-diameter portion 5124 toward the nozzle 5113. The first small-diameter portion 5122 has a tapered head 5123 which works to regulate an open area of an outlet of the nozzle 5113.

The second small-diameter portion 5124 extends from the large-diameter portion 5121 away from the nozzle 5113. The large-diameter portion 5121 has a chambered corner which works as a sealing surface 5125, as will also be referred to as a needle side sealing surface below. The needle side sealing surface 5125 abuts to the nozzle body side sealing surface 5115 to close the main fluid flow path 5112 fully. The nozzle unit 51 is so designed in dimension as to keep the nozzle 5113 away from the tapered surface 5123 when the needle side sealing surface 5125 is placed in contact with the nozzle body side sealing surface 5115.

The pipe unit 52 is joined to an end of the nozzle body 511 of the nozzle unit 51 from which the nozzle 5113 extends. The pipe unit 51 is made of a hollow cylinder and has formed therein a discharge path 521 which leads to an outlet of the ejector pump 50 and extends in a lengthwise direction thereof and from which a jet of the hydrogen gas emitted from the nozzle 5113 is discharged out of the outlet of the ejector pump 50. The discharge path 521 has a downstream portion into which the nozzle 5113 is inserted and an upstream portion connected to the fuel cell stack 10 through the hydrogen supply line 30. The pipe unit 52 has formed in a central portion thereof a suction port 523 leading to the discharge path 521. To the suction port 523, the off-gas circulation path 34 is connected.

The drive unit 53 works to drive or move the needle 512 of the nozzle unit 51 and is joined to an end of the nozzle body 511 far from the nozzle 5113. The drive unit 53 is implemented by a stepper motor which consists of a rotor 531, a stator 532, a shield 533, and a needle guide 534

The needle guide 534 is secured to the nozzle body 511 and works to guide sliding movement of the second small-diameter portion 5124 of the needle 512. The second small-diameter portion 5124 is joined at an end thereof to the rotor 531. The rotor 531 has an internal thread 5321 which meshes with an external thread 5341 of the needle guide 534. Rotation of the rotor 531 will cause the rotor 531 and the needle 512 to slide in the lengthwise direction of the ejector pump 50.

An operation of the fuel cell system will be described below.

When the hydrogen is being consumed in the fuel cell stack 10, the hydrogen supply device 31 continues to supply the hydrogen gas to the fuel cell stack 10 through the hydrogen supply line 30 and the ejector pump 50. A main flow of the hydrogen gas enters the ejector pump 50 and is discharged from the nozzle 513 in the form of a high-speed gas stream. Upon passage through the ejector pump 50, a dynamic energy of the main flow of hydrogen gas is transformed into a kinetic energy working to circulate the off-gas. Specifically, the high-speed gas stream of hydrogen gas emerging from the nozzle 5113 travels through the discharge path 521 while sucking the off-gas existing around the outer periphery of the nozzle 5113. This causes a negative pressure or vacuum to be produced around the outer periphery of the nozzle 5113 which works to suck the off-gas flowing through the off-gas circulation line 34 from the suction port 523. The off-gas then enters the discharge path 521 and is mixed with the hydrogen gas emerging from the nozzle 5113 which, in turn, supplied to the fuel cell stack 10 through the hydrogen supply line 30.

Regulation of the amount of hydrogen gas outputted from the nozzle 5113 is achieved by actuating the drive unit 53 and moving the needle 512 to change the position (i.e., the open area) of the nozzle 5113.

When the fuel cell stack 10 is turned off to stop consuming the hydrogen gas, the drive unit 53 is actuated to move the needle 512 to the right, as viewed in FIG. 4, until the needle side sealing surface 5125 abuts the nozzle body side sealing surface 5115 and closes the main flow path 5112.

Specifically, when it is required to suspend the supply of hydrogen gas to the fuel cell stack 10, the needle side sealing surface 5125 is brought into abutment with the nozzle body side sealing surface 5115 to close the main flow path 5112, thereby avoiding undesirable application of the high-pressure of the hydrogen gas to the fuel cell stack 10 which leads to breakage or acceleration of fatigue of the electrode films of the fuel cell stack 10 which results in a failure in operation of the fuel cell stack 10.

When the needle side sealing surface 5125 is placed in abutment with the nozzle body side sealing surface 5115, the tapered head 5123 of the needle 512 is, as described above, designed not to abut the nozzle 5113, thereby avoiding wear or deformation of the nozzle 5113 and the tapered head 5123. This ensures the stability of the main flow of hydrogen gas over a prolonged period of time.

Figure 5:
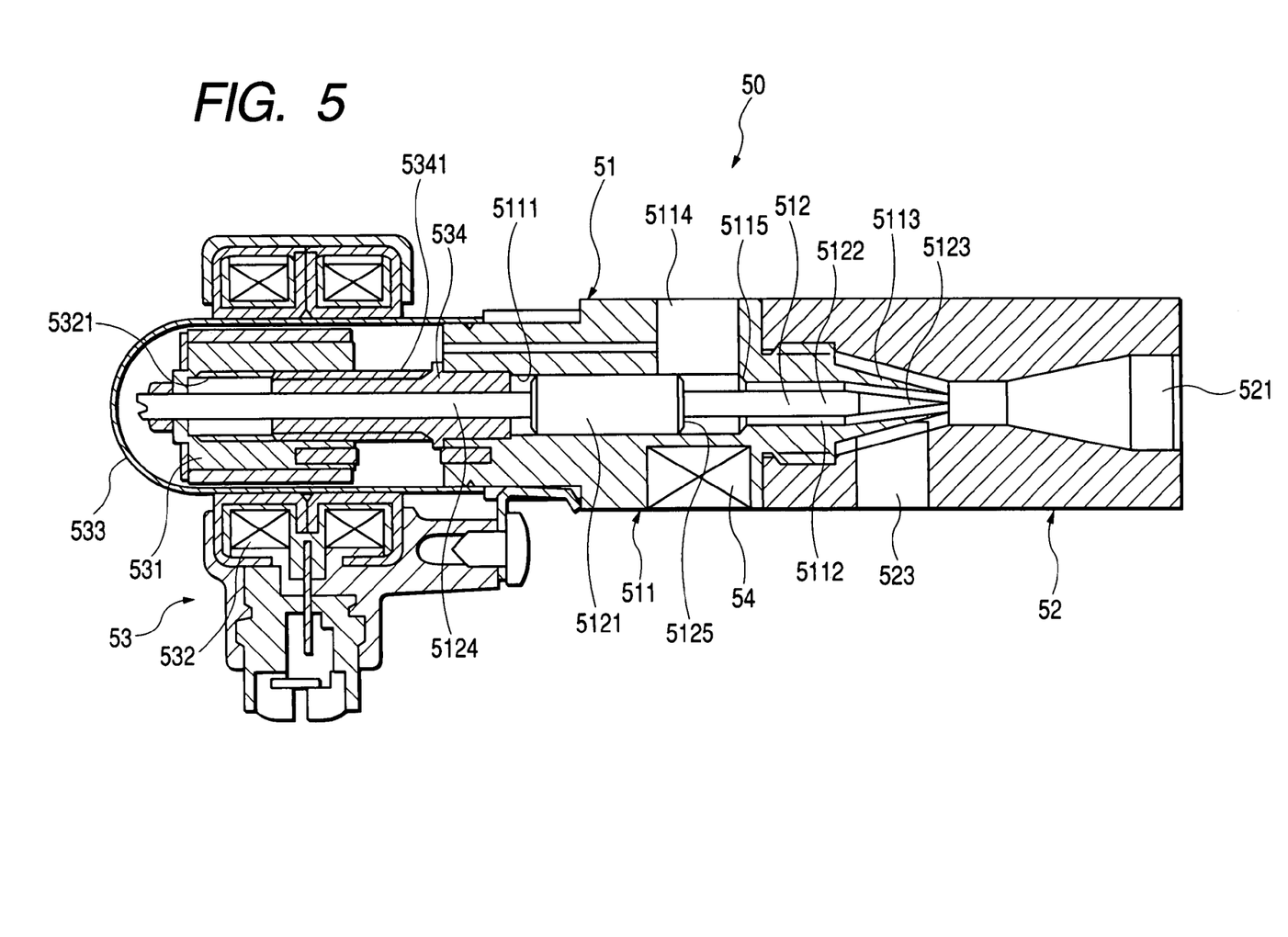
FIG. 5 is a longitudinal sectional view which shows an internal structure of an ejector pump according to the second embodiment of the invention which is placed in a fully open position.
Figure 6:
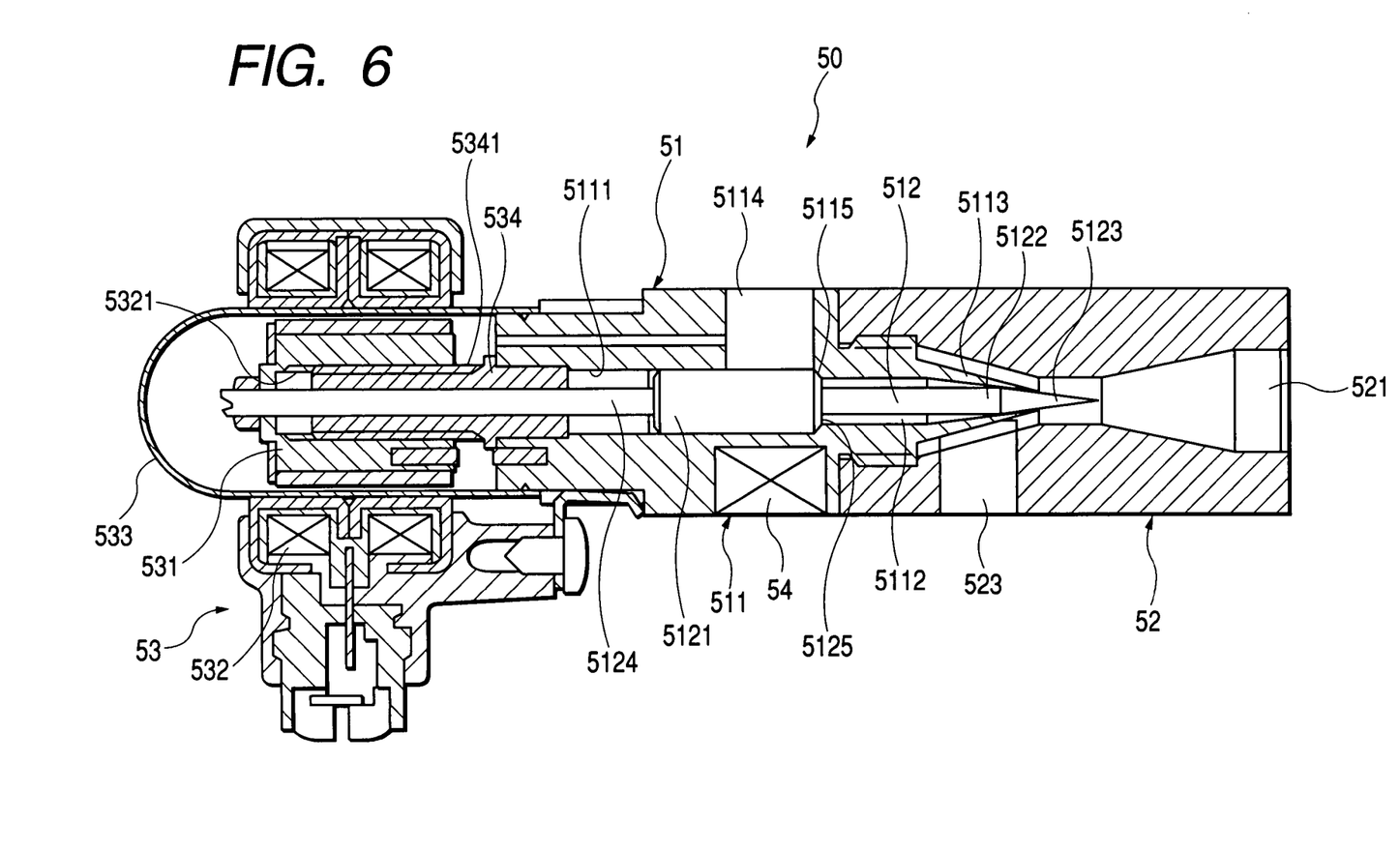
FIG. 6 is a longitudinal sectional view which shows an internal structure of an ejector pump of the second embodiment which is placed in a closed position.

FIGS. 5 and 6 show the ejector pump 50 according to the second embodiment of the invention. The same reference numbers as employed in the first embodiment refer to the same parts, and explanation thereof in detail will be omitted here. FIG. 5 shows the ejector pump 50 placed in a fully open position. FIG. 6 shows the ejector pump 50 placed in a closed position.

The ejector pump 50 is equipped with a PTC heater 54 which works to add thermal energy to the main flow of hydrogen gas. The PTC heater 54, as is well known in the art, works as a constant temperature heater designed to perform a temperature self-control function. Use of the PTC heater 54, thus, eliminates the need for an on-off control circuit required to regulate the temperature of heat added to the hydrogen gas and results in a simplified structure of the ejector pump 50 as compared with when a hot wire heater is employed.

The PTC heater 54 is, as clearly shown in FIG. 5, installed in a peripheral wall (i.e., a circumference) of the nozzle body 511 and faces the main port 5114. In other words, the PTC heater 54 and the main port 5114 are disposed at substantially the same location in the lengthwise direction of the nozzle body 511, thereby ensuring the stability of addition of thermal energy to the main flow of hydrogen gas entering at the main port 5114.

The PTC heater 54 also faces the nozzle body side sealing surface 5115, thereby alleviating the problem that upon abutment of the needle side sealing surface 5125 to the nozzle body side sealing surface 5115 in lower temperature environments, they may be frozen by the cold.

The hydrogen gas flowing from the hydrogen supply device 31 into the main port 5114 is heated by the PTC heater 54. The large-diameter portion 5121 of the needle 512 is placed in contact with the nozzle body 511 at all the time. The inside of the nozzle body 511 is cooled by the main flow of hydrogen gas, so that it is lower in temperature than the ambient air. Usually, the greater a difference in temperature between two members, the greater the degree of transfer of heat from one of the members to the other. Therefore, the thermal energy produced by the PTC heater 54 is transferred to inside the nozzle body 511 efficiently.

The ejector pump 50 is, as described above, made up of three separate units: the nozzle unit 51, the pipe unit 52, and the drive unit 53. This structure serves to divide a heat mass of the ejector pump 50 into three. Installation of the PTC heater 54 within the nozzle body 511 facilitates easy of the transfer of heat to the inside of the nozzle body 511. Specifically, the structure of the ejector pump 50 permits direct transfer of the heat from the PTC heater 54 to the nozzle unit 51, but has heat transfer blocking interfaces formed between the nozzle unit 51 and the pipe unit 52 and between the nozzle unit 51 and the drive unit 53, thereby minimizing the transfer of the heat to the pipe unit 52 and the drive unit 53 from the PTC heater 54, which enhances the efficiency of consuming the thermal energy produced by the PTC heater 54 in the nozzle unit 51.

Figure 7:
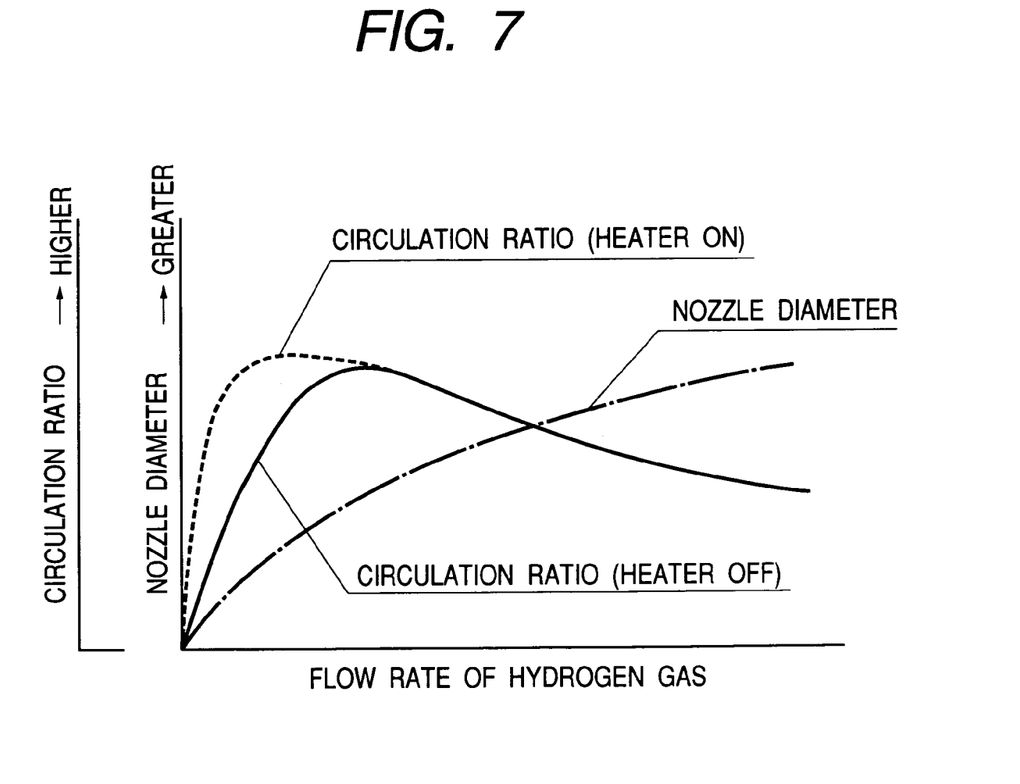
FIG. 7 is a graph which represents off-gas circulation ratios when a PTC heater is turned on and off.

FIG. 7 is a graph which represents off-gas circulation ratios when the PTC heater 54 is turned on and off. The off-gas circulation ratio, as referred to herein, is a ratio of the amount of the off-gas circulated to the fuel cell stack 10 to the amount of hydrogen gas supplied directly from the hydrogen supply device 31. The graph shows that addition of thermal energy produced by the PTC heater 54 to the hydrogen gas results in an increased kinetic energy of the hydrogen gas, thereby enhancing the performance of the ejector pump 50 to circulate the off-gas to the fuel cell stack 10, that is, that the off-gas circulation ratio is increased within a range where the amount of the hydrogen gas supplied to the fuel cell stack 10 is small.

Increasing of the amount of the off-gas to be circulated to the fuel cell stack 10 may also be achieved by elevating the pressure of the hydrogen gas, but this requires an increased mechanical strength of pipes of the system. The structure of the ejector pump 50 of this embodiment serves to enhance the ability to circulate the off-gas without elevating the pressure of the hydrogen gas, that is, without the need for increasing the mechanical strength of the pipes of the system.

While the present invention has been disclosed in terms of the preferred embodiments in order to facilitate better understanding thereof, it should be appreciated that the invention can be embodied in various ways without departing from the principle of the invention. Therefore, the invention should be understood to include all possible embodiments and modifications to the shown embodiments witch can be embodied without departing from the principle of the invention as set forth in the appended claims. For instance, the ejector pump 50 may alternatively be employed as a pump to circulate refrigerant in a refrigerating system. Instead of the PTC heater 54, any other known type of heater may be used.

What is claimed is:

1. An ejector pump comprising:
   a flow path unit having formed therein a fluid discharge path leading to a fluid outlet;
   a nozzle body including a main fluid inlet port to which a main fluid is inputted, a nozzle which has a nozzle outlet from which a jet of the main fluid is emitted to the discharge path of said flow path unit and then discharged from the fluid outlet, and a main fluid flow path which has a length and communicates between the main fluid inlet port and the nozzle outlet of the nozzle, physical energy of the jet of the main fluid emitted from the nozzle serving to suck and direct a sub-fluid to the discharge path of said flow path unit, said nozzle body having a first sealing surface exposed to a portion of the main fluid flow path;
   a needle disposed coaxially within the main fluid flow path, said needle being slidable in a lengthwise direction of the main fluid flow path to change an open area of the nozzle outlet, said needle having a second sealing surface, when said needle is moved within the main fluid flow path and brings the second sealing surface thereof into abutment to the first sealing surface of said nozzle body, the main fluid flow path being closed; and
   a heater working to add thermal energy to the main fluid, said heater being disposed in a portion of said nozzle body which surrounds a location where the first sealing surface abuts the second sealing surface.

2. The ejector pump as set forth in claim 1, wherein said needle is kept away from the nozzle upon the abutment of the second sealing surface to the first sealing surface.

3. The ejector pump as set forth in claim 1, wherein said nozzle body has an inner wall forming the main fluid flow path, the inner wall having a shoulder defining the first sealing surface, and wherein said needle has a shoulder defining the second sealing surface.

4. An ejector pump comprising:
   a flow path unit having formed therein a fluid discharge path leading to a fluid outlet;
   a nozzle body including a main fluid inlet port to which a fluid is inputted, a nozzle which has a nozzle outlet from which a jet of the main fluid is emitted to the discharge path of said flow path unit and then discharged from the outlet, and a main fluid flow path which has a length and communicates between the main fluid inlet port and the nozzle outlet of the nozzle, physical energy of the jet of the main fluid emitted from the nozzle serving to suck and direct a sub-fluid to the discharge path of said flow path unit;
   a heater being disposed in said nozzle body and working to add thermal energy to the main fluid; and
   a heat transfer blocking interface formed between the nozzle body and the flow path unit.

5. The ejector pump as set forth in claim 4, wherein said heater is disposed in a portion of a circumference of said nozzle body in which the main fluid inlet port is formed.

6. The ejector pump as set forth in claim 4, wherein said heater is implemented by a constant temperature heater designed to perform a temperature self-control function.

7. The ejector pump as set forth in claim 4, wherein said nozzle body and said flow path unit are made of separate members, respectively.

8. The ejector pump as set forth in claim 4, further comprising a needle movable in a lengthwise direction of the main fluid flow path to change an open area of the nozzle outlet and a drive unit working to move the needle, and wherein said drive unit, said nozzle body, and the flow path unit are made of separate members, respectively.

9. A fuel cell system comprising:
   a fuel cell working to produce an electrical energy arising from chemical reaction of hydrogen with oxygen;
   a hydrogen supply line through which a hydrogen gas is supplied from a hydrogen supply device to said fuel cell;
   an off-gas circulation line working to circulate an off-gas, which is emitted from said fuel cell and contains an unreacted portion of the hydrogen gas not subjected to the chemical reaction, to said fuel cell through said hydrogen supply line; and an ejector pump installed in a junction of said hydrogen supply line and said off-gas circulation line, said ejector pump including (a) a flow path unit having formed therein a fluid discharge path leading to a fluid outlet, (b) a nozzle body including a main fluid inlet port to which the hydrogen gas supplied from the hydrogen supply device is inputted, a nozzle which has a nozzle outlet from which a jet of the hydrogen gas is emitted to the discharge path of said flow path unit and then discharged from the fluid outlet to said fuel cell through said hydrogen supply line, and a main fluid flow path which has a length and communicates between the main fluid inlet port and the nozzle outlet of the nozzle, physical energy of the jet of the hydrogen gas emitted from the nozzle serving to suck and mix the off-gas with the hydrogen gas emerging from the nozzle, said nozzle body having a first sealing surface exposed to a portion of the main fluid flow path, (c) a needle disposed coaxially within the main fluid flow path, said needle being slidable in a lengthwise direction of the main fluid flow path to change an open area of the nozzle outlet, said needle having a second sealing surface, when said needle is moved within the main flow path and brings the second sealing surface thereof into abutment to the first sealing surface of said nozzle body, the main fluid flow path being closed, and (d) a heater being disposed in said nozzle body and working to add thermal energy to the hydrogen gas; and a heat transfer blocking interface formed between the nozzle body and the flow path unit.

10. A fuel cell system comprising:

a fuel cell working to produce an electrical energy arising from chemical reaction of hydrogen with oxygen;

a hydrogen supply line through which a hydrogen gas is supplied from a hydrogen supply device to said fuel cell;

an off-gas circulation line working to circulate an off-gas, which is emitted from said fuel cell and contains an unreacted portion of the hydrogen gas not subjected to the chemical reaction, to said fuel cell through said hydrogen supply line; and an ejector pump installed in a junction of said hydrogen supply line and said off-gas circulation line, said ejector pump including (a) a flow path unit having formed therein a fluid discharge path leading to a fluid outlet, (b) a nozzle body including a main fluid inlet port to which the hydrogen gas is inputted, a nozzle which has a nozzle outlet from which a jet of the hydrogen gas is emitted to the discharge path of said flow path unit and then discharged from the fluid outlet to said fuel cell through said hydrogen supply line, and a main fluid flow path which communicates between the main fluid inlet port and the nozzle outlet of the nozzle, physical energy of the jet of the hydrogen gas emitted from the nozzle serving to suck and mix the off-gas with the hydrogen gas emerging from the nozzle, and (c) a heater being disposed in said nozzle body and working to add thermal energy to the hydrogen gas; and a heat transfer blocking interface formed between the nozzle body and the flow path unit.

* * * * *